US008430376B1

(12) United States Patent
Danner et al.

(10) Patent No.: US 8,430,376 B1
(45) Date of Patent: Apr. 30, 2013

(54) SPRINKLER VALVE MODULE WITH RECIPROCATING VALVE SEAT

(75) Inventors: Fred M. Danner, Vista, CA (US); Jeff M. Smith, Vista, CA (US); LaMonte D. Porter, San Marcos, CA (US)

(73) Assignee: Hunter Industries, Inc., San Marcos, CA (US)

( * ) Notice: Subject to any disclaimer, the term of this patent is extended or adjusted under 35 U.S.C. 154(b) by 326 days.

(21) Appl. No.: 12/732,069

(22) Filed: Mar. 25, 2010

Related U.S. Application Data

(60) Continuation-in-part of application No. 11/859,147, filed on Sep. 21, 2007, now abandoned, which is a division of application No. 11/364,434, filed on Feb. 28, 2006, now Pat. No. 7,303,147.

(51) Int. Cl.
*F16K 31/00* (2006.01)

(52) U.S. Cl.
USPC ............. 251/61; 251/331; 251/333; 251/361; 239/203; 239/240

(58) Field of Classification Search .................... 251/61, 251/61.2, 62, 63, 63.4, 63.5, 174, 333, 331; 239/200, 201, 203–206, 237, 240, 225.1, 239/242, 456, 569, 575
See application file for complete search history.

(56) References Cited

U.S. PATENT DOCUMENTS

| | | | | |
|---|---|---|---|---|
| 2,833,299 | A | 5/1958 | Marriette | 137/221 |
| 4,637,548 | A | 1/1987 | Ray et al. | 239/201 |
| 5,871,156 | A | 2/1999 | Lawson | 239/201 |
| 5,899,386 | A | 5/1999 | Miyasato et al. | 239/289 |
| 5,927,607 | A | 7/1999 | Scott | 239/205 |
| 6,186,413 | B1 | 2/2001 | Lawson | 239/205 |
| 6,491,235 | B1 | 12/2002 | Scott et al. | 239/206 |
| 6,854,664 | B2 | 2/2005 | Smith | 239/205 |
| 7,303,147 | B1 | 12/2007 | Danner et al. | 239/203 |

*Primary Examiner* — John K Fristoe, Jr.
*Assistant Examiner* — Marina Tietjen
(74) *Attorney, Agent, or Firm* — Michael H. Jester

(57) ABSTRACT

A valve module for removable installation inside the outer case of a sprinkler after removal of a riser with a nozzle turret normally mounted for reciprocation within the case. The module includes an upper valve support housing and a lower support basket removably connected to the valve support housing. A valve member is vertically reciprocable within the valve support housing to engage and disengage a valve seat in the support basket. The support basket is loosely connected to the valve support housing so that the valve seat can reciprocate relative to the valve support housing.

20 Claims, 9 Drawing Sheets

SPRINKLER VALVE MODULE WITH RECIPROCATING VALVE SEAT

CROSS-REFERENCE TO RELATED APPLICATIONS AND PATENT

This application is a continuation-in-part of, and claims priority from, the similarly entitled co-pending U.S. patent application Ser. No. 11/859,147 filed Sep. 26, 2007, which in turn was a division of the similarly entitled U.S. patent application Ser. No. 11/364,434 filed Feb. 28, 2006, now U.S. Pat. No. 7,303,147 granted Dec. 4, 2007.

FIELD OF THE INVENTION

The present invention relates to sprinklers used to irrigate lawns, gardens and landscaping, and more particularly, to so-called valve-in-head sprinklers that have built in valves for turning ON and OFF the application of water by the sprinkler.

BACKGROUND

Irrigation systems used in homes typically comprise a garage-mounted electronic controller that selectively turns a plurality of solenoid actuated valves ON and OFF in accordance with a pre-programmed watering schedule. The valves admit water to subterranean PVC pipes having several spray, rotor-type or drip-type sprinklers attached to the pipes at spaced intervals. The solenoid actuated valves are usually housed together in a plastic valve box buried near the electronic controller.

In some environments, such as golf courses, so called "valve-in-head" sprinklers are preferred. They have a diaphragm valve built into the lower end thereof which is typically actuated by a solenoid mounted in the sprinkler itself that opens and closes a pilot valve. Each valve-in-head sprinkler on a golf course can thus be individually actuated by an electronic controller usually mounted a considerable distance away.

In U.S. Pat. No. 6,491,235 of Scott et al., assigned to Hunter Industries, Inc., there is disclosed a valve-in-head sprinkler that has a top serviceable diaphragm module. The diaphragm valve module can be readily replaced without excavation and removal of the entire sprinkler if the diaphragm valve module is worn, damaged by grit or otherwise defective, e.g. if there is leakage from the top of the outer sprinkler case when the valve is in its OFF state. The telescoping riser that contains the nozzle, turbine and gear drive train is first removed from the outer sprinkler case. The diaphragm valve module, which is mounted in the lower end of the outer sprinkler case, can then be withdrawn and replaced.

Valve-in-head sprinklers typically operate at a relatively high pressures, e.g. over one hundred PSI, and in some cases as high as two hundred PSI. When the valve is in its CLOSED or turbine state such high water pressures place substantial strains on the mechanical components which can lead to failures. It would be desirable to have an improved replaceable valve module for a valve-in-head sprinkler that alleviates this problem.

SUMMARY OF THE INVENTION

The present invention provides a valve module for removable installation inside the outer case of a sprinkler after removal of a riser with a nozzle turret normally mounted for reciprocation within the case. The module includes an upper valve support housing and a lower support basket removably connected to the valve support housing. A valve member is vertically reciprocable within the valve support housing to engage and disengage a valve seat in the support basket. The support basket is loosely connected to the valve support housing so that the valve seat can reciprocate relative to the valve support housing.

DETAILED DESCRIPTION

Figure 1:
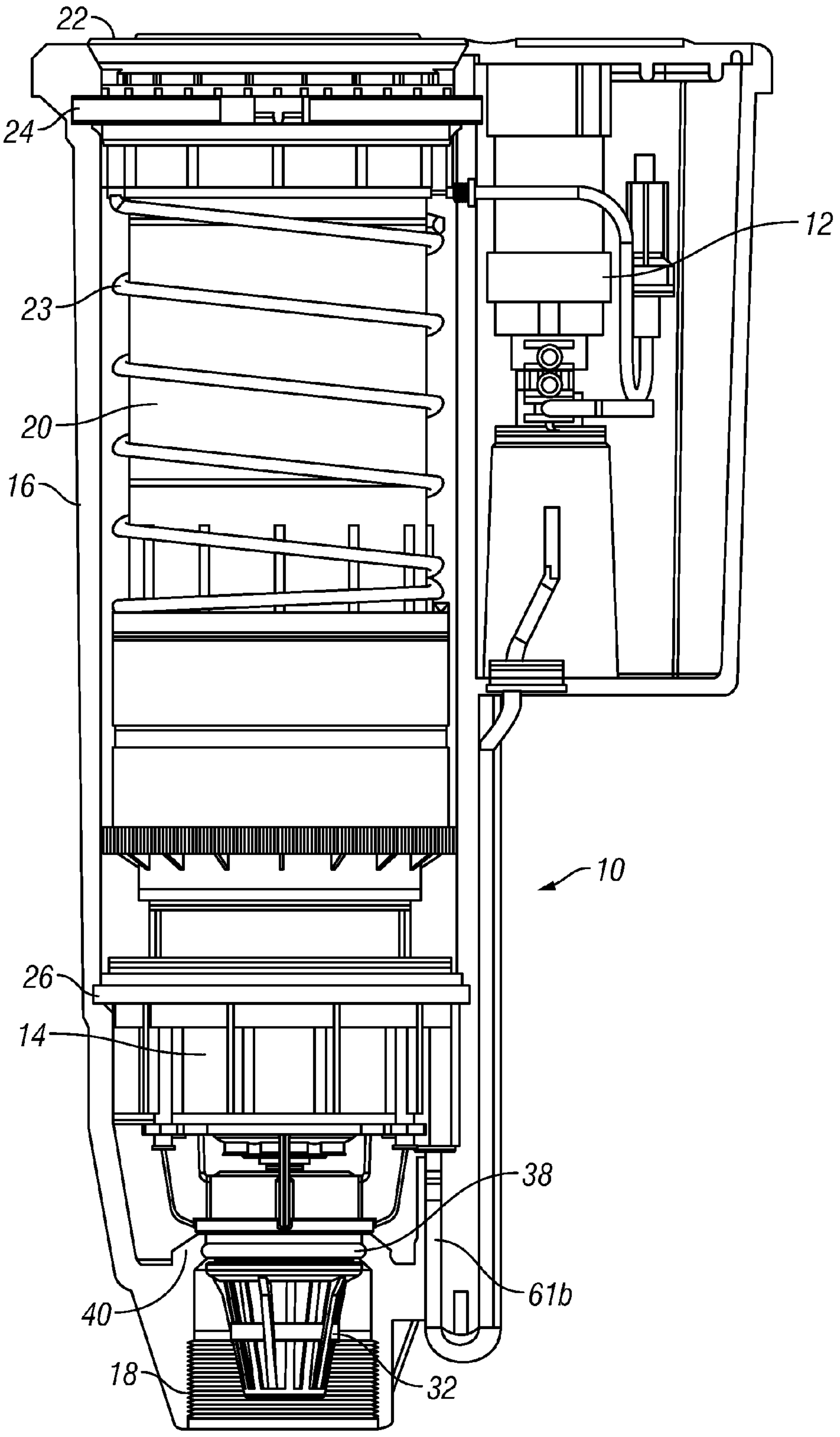
FIG. 1 is a part vertical section, part side elevation view of a valve-in-head sprinkler with a replaceable valve module in accordance with an embodiment of the present invention.
Figure 2:
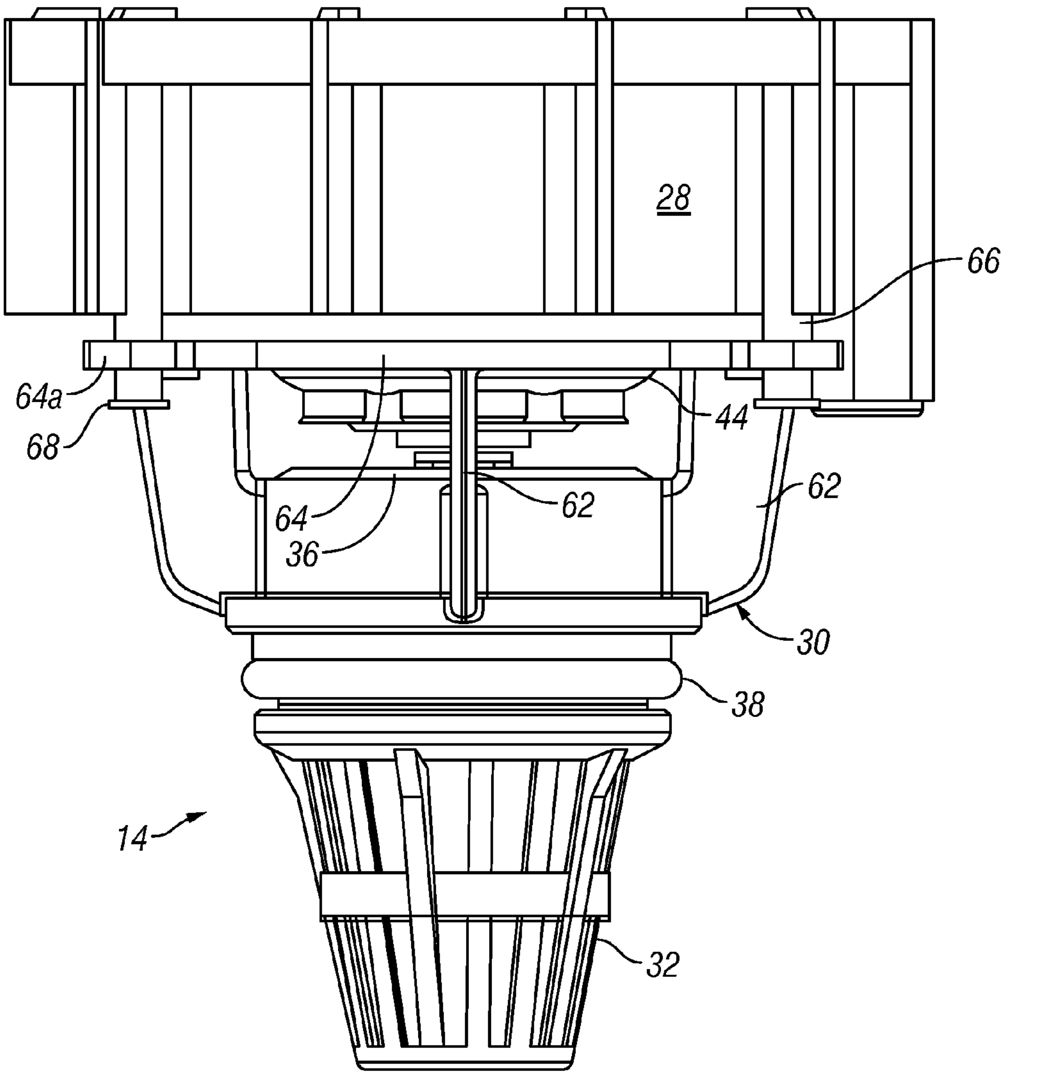
FIG. 2 is an enlarged side elevation view of the valve module of the sprinkler of FIG. 1 illustrating its valve in an OPEN state.
Figure 3:
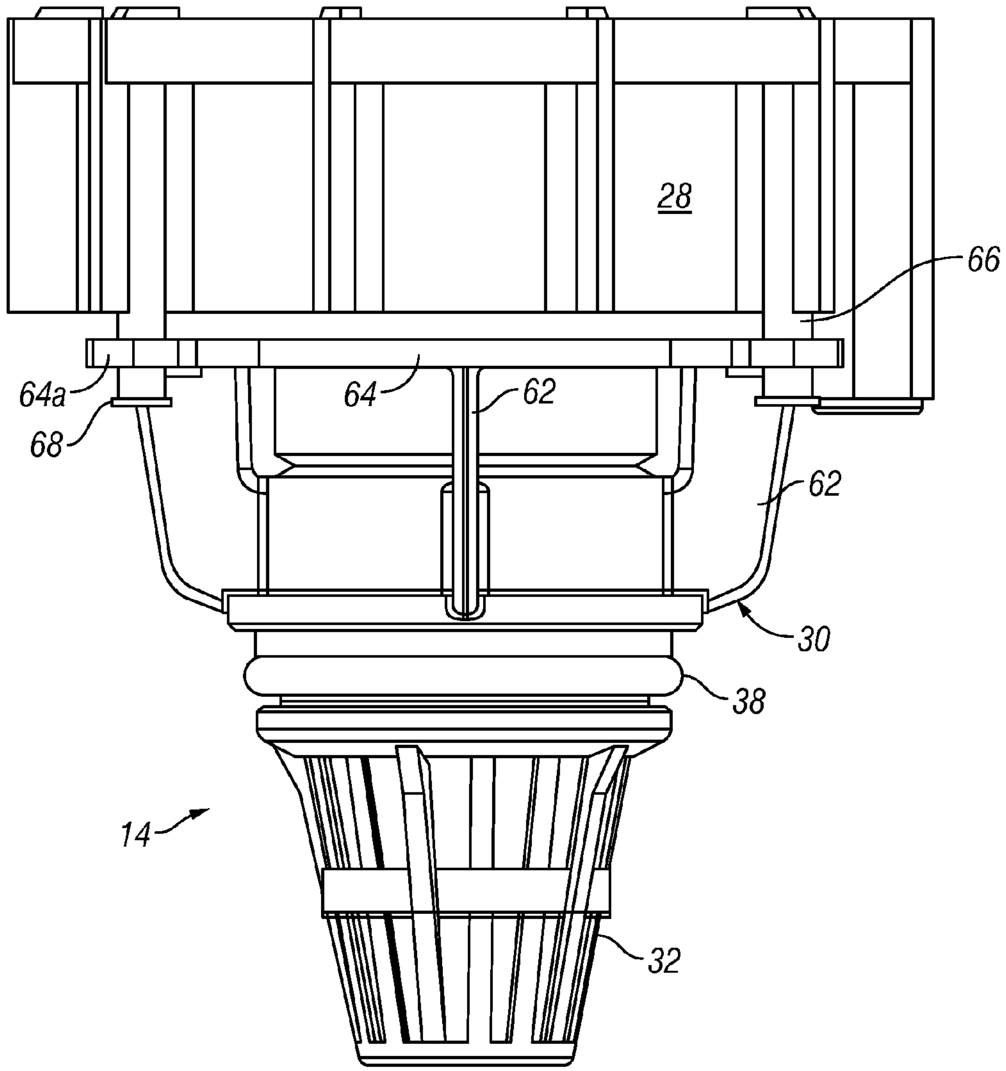
FIG. 3 is an enlarged side elevation view of the valve module of the sprinkler of FIG. 1 illustrating its valve in an CLOSED state.

The entire disclosure of U.S. Pat. No. 6,491,235 granted Dec. 10, 2002 to Scott et al. is hereby incorporated by reference. Referring to FIG. 1, a valve-in-head rotor type sprinkler 10 includes a valve actuator component assembly 12 and a top serviceable diaphragm valve module 14. The valve module 14 is mounted in the lower end of a generally cylindrical outer case 16 having a female threaded inlet 18. A tubular riser 20 is vertically reciprocable within the outer case 16 when the valve module 12 is opened and closed. A cylindrical nozzle head or turret 22 is rotatably mounted at the upper end of the riser 20. The riser 20 is held in its retracted position by a coil spring 23 held in place by an upper snap ring 24. A turbine (or other impeller such as a ball drive), gear reduction, and reversing mechanism (not visible) are mounted in the riser 20 and rotate the nozzle turret 22 through an adjustable arc, as well known in the art. A lower snap ring 26 releasably holds the valve module 20 in position within the lower end of the outer case 16.

FIGS. 2-6 illustrate details of the valve module 14. The valve module 14 includes a generally cylindrical upper valve support housing 28 and a lower valve seat support basket 30 connected to the underside of the upper valve support housing 28. The valve seat support basket 30 is formed with a frusto-conical filter screen 32 at its lower end. A cylindrical upper section 34 of the valve support basket 30 has an upper end that forms a valve seat 36. An O-ring 38 made of suitable elastomeric material provides a seal between the valve seat support basket 30 and a shoulder 40 (FIG. 1) of the outer case 16.

A cylindrical piston valve member 42 is vertically reciprocable within the support housing 28. A horizontally extending valve disk member 44 made of suitable elastomeric material extends across the lower end of the piston valve member 42 and its peripheral edge is moved into and out of sealing engagement with the valve seat 36. The piston valve member 42 slides up and down through a circular aperture in a guide member 46. The outer periphery of a flexible elastomeric diaphragm 48 is locked between the guide member 46 and a generally dome-shaped cap portion 50 of the valve support housing 28. The inner periphery of the diaphragm 48 is locked between the inner and outer sections of the piston valve member 42. A coil spring 52 is captured between the center of the cap portion 50 and the bottom of the inner section of the piston valve member 42 to bias the piston valve member to its lower CLOSED position illustrated in FIG. 5. A metering pin 54 extends through a metering plate assembly 56 attached to the underside of the piston valve member 42, overlying the valve disk member 44. The metering pin 54 extends axially through the center of the piston valve member 42 and its upper end is captured in a socket 58 formed in the underside of the center of the cap portion 50. All of the components of the diaphragm valve module 14 are removable as unit from the upper end of the outer case 16 upon removal of the riser 20 which requires removal of the snap rings 24 and 26.

Figure 5:
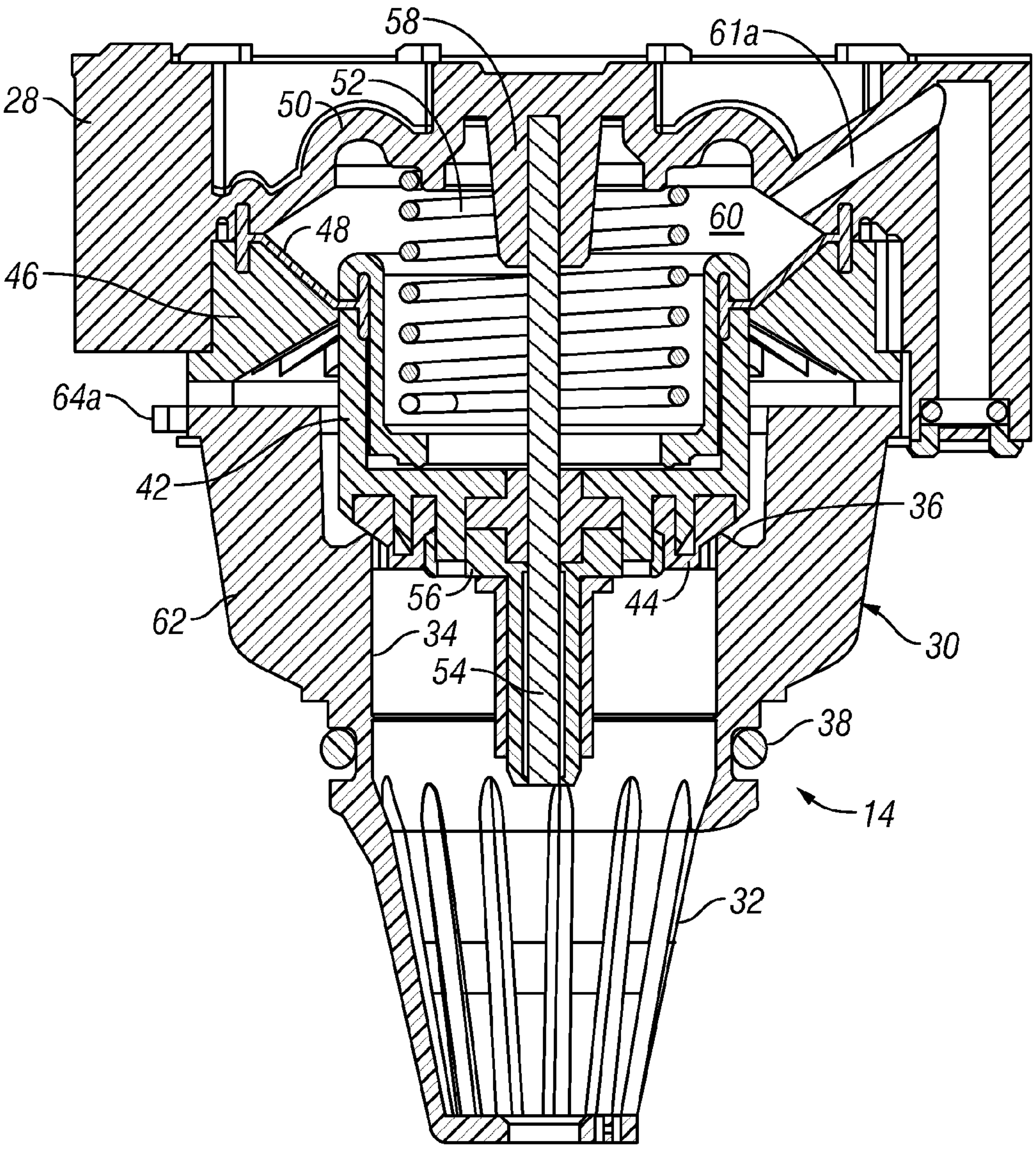
FIG. 5 is a vertical sectional similar to FIG. 4 illustrating the valve of the module in a CLOSED state.
Figure 6:
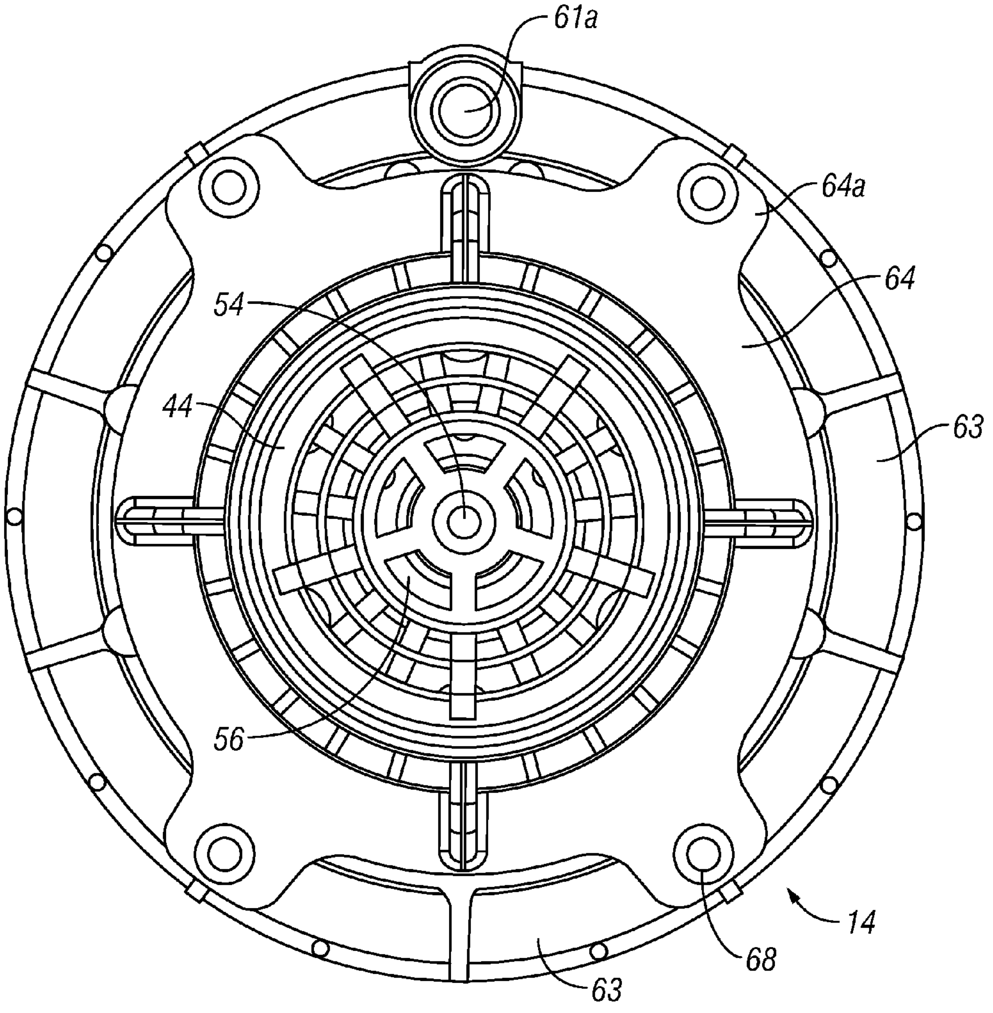
FIG. 6 is an enlarged bottom plan view of valve module of the sprinkler of FIG. 1.

The valve actuator component assembly 12 (FIG. 1) can be actuated to vent water from the chamber 60 (FIG. 5) between the upper side of the diaphragm 48 and the cap portion 50 through a pilot hole passage 61*a* (FIG. 4) connected via tube 61*b* (FIG. 1). The piston valve member 42 then moves from its lower CLOSED position illustrated in FIG. 5 to its upper OPEN position illustrated in FIG. 4. This disengages the valve disk member 44 from the valve seat 36 allowing water to flow through the inlet 18, through the filter screen 32 and out of the valve support basket 30. When the water leaves the valve seat support basket 30 it flows between four circumferentially spaced (ninety degrees apart) vertically extending ribs 62 of the valve seat support basket 30 and through a plurality of circumferentially spaced flow passages 63 (FIG. 6). This water then flows into the open lower end of the riser 20 and exits from the nozzle turret 22 in an inclined stream.

Figure 4:
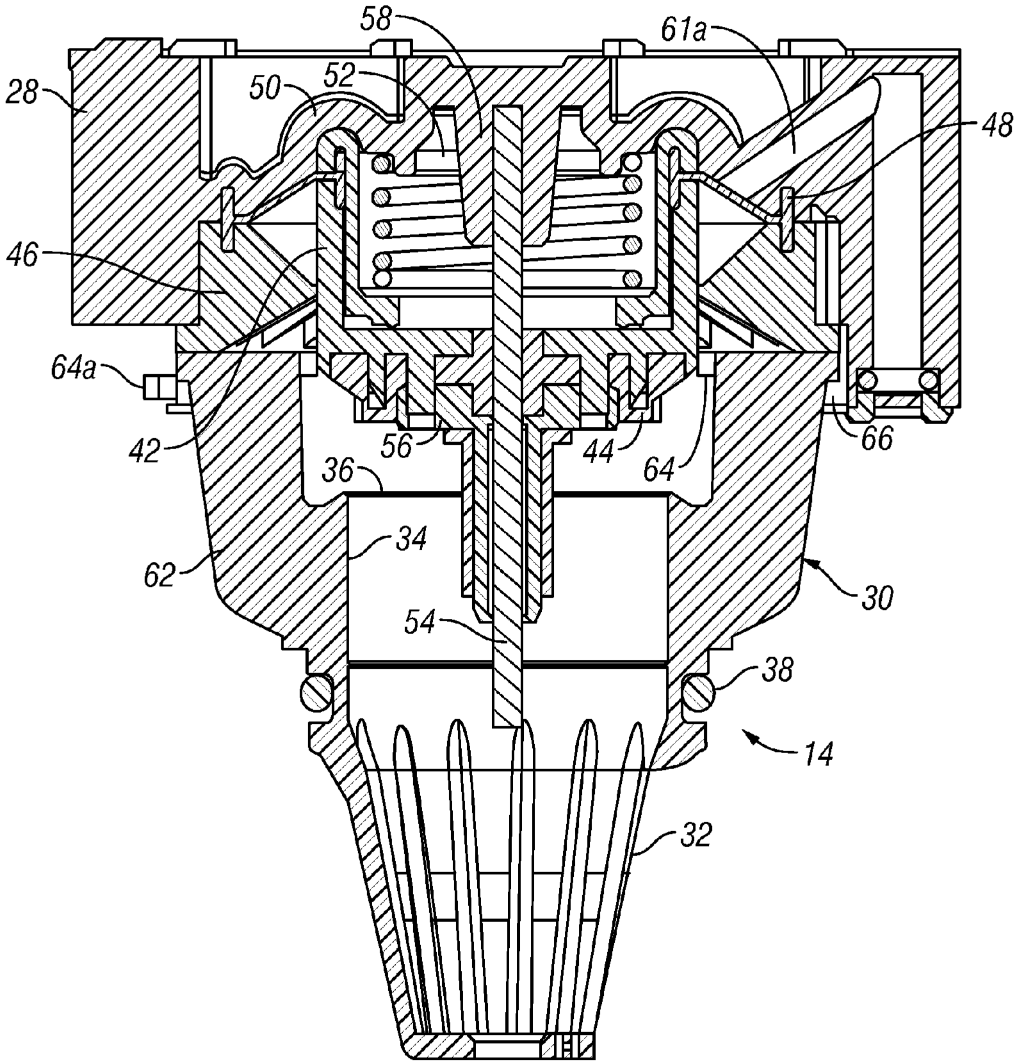
FIG. 4 is an enlarged vertical sectional view of the valve module of the sprinkler of FIG. 1 illustrating its valve in an OPEN state.

The valve seat support basket 30 (FIGS. 2-5) is loosely connected to the valve support housing 28 so that the valve seat 36 can reciprocate vertically relative to the valve support housing 28. By way of example only, the amount of reciprocation of the valve seat support basket 30 may be less than five millimeters. This greatly reduces the mechanical stress and loading on the ribs 62 and other components of the diaphragm valve module 14 when the diaphragm valve module 14 is in its closed or OFF state illustrated in FIGS. 3 and 5. The valve seat support basket 30 is connected to the upper valve support housing 28 by a retaining ring 64 (FIG. 6) with four flanges 64*a* having apertures that slide vertically over four circumferentially spaced vertical retaining posts 66. The retaining posts 66 vertically extend from the underside of the valve support housing 28. FIG. 4 illustrates the slightly raised position of the valve seat support basket 30 when the diaphragm valve module 14 is in its OPEN state. FIG. 5 illustrates the slightly lowered position of the valve seat support basket 30 when the diaphragm valve module 14 is in its CLOSED state. The lower ends of the retaining posts 66 are swaged to provide a flare 68 (FIGS. 2 and 6) to keep the retaining ring 64 from becoming detached from the valve support housing 28.

The four retaining posts 66 retain the valve support basket 30 in a manner such that the valve support basket 30 is not under spring tension when the diaphragm valve module 14 is not yet installed in the outer case 16. This prevents stress on the ribs 62, retaining ring 64 and retaining posts 66. The valve seat 36 is capable of independent movement relative to the valve support housing 28 so that the closing forces generated by the piston valve member 42 do not apply unwanted loading on the various components of the valve support basket 30 under relatively high water pressures, e.g. over one hundred PSI. When the diaphragm valve module 14 goes to its CLOSED state, the valve support basket 30 is forced downwardly until it stops against the upper end of shoulder 40 (FIG. 1). The valve support housing 28 in turn moves upwardly until it stops against the underside of lower snap ring 26. The top of the valve support housing has projections (not visible) that lock the lower snap ring 26, providing a safety feature to prevent unsafe removal of the lower snap ring 26 when the sprinkler 10 is pressurized. The ability of the valve support basket 30 to reciprocate downwardly when the pressurized water to the sprinkler 10 is turned OFF allows the lower snap ring to be unlocked and removed.

Figure 7:
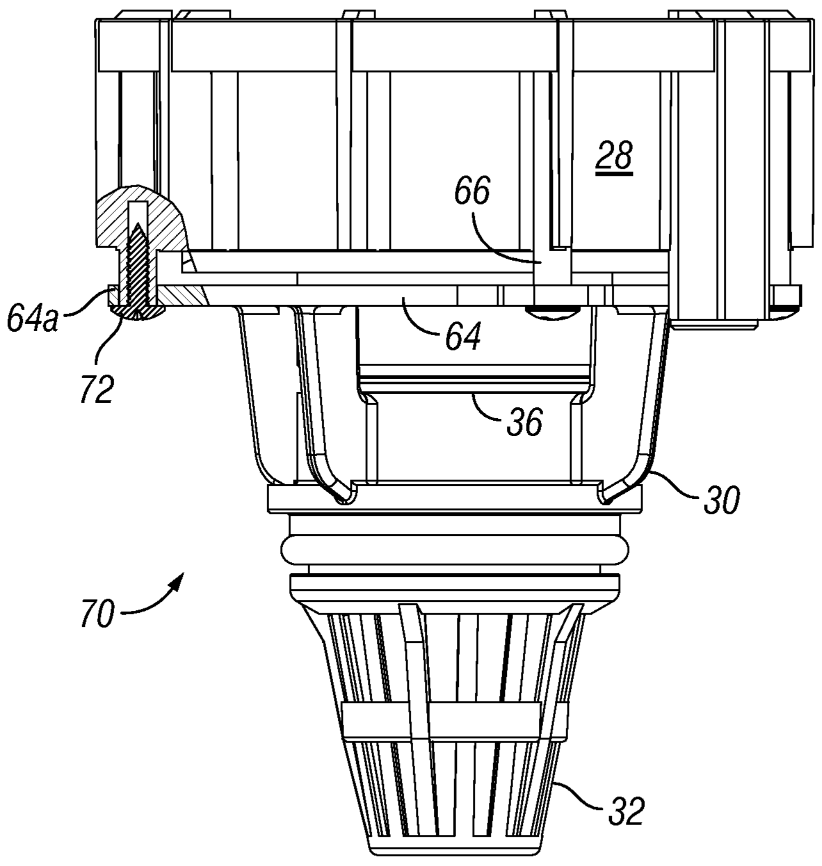
FIG. 7 is an enlarged side elevation view of an alternate embodiment that allows the lower valve seat support basket to be separated from the upper valve support housing by removing a plurality of screws.

FIG. 7 illustrates an alternate embodiment of the valve module 70 that allows the lower valve seat support basket 30 and its integrally formed valve seat 36 to be separated from the upper valve support housing 28 by removing a plurality of stainless steel Phillips head screws 72. The screws 72 normally attach to the lower ends of corresponding retaining posts 66 to prevent the retaining ring 64 from sliding off of the posts 66. The head of the Phillips screw 72 replaces the retaining flange 68 (FIG. 3) of posts 66. If the valve seat 36 is damaged the lower valve seat support basket 30 and the integrally formed valve seat 36 can readily be removed and replaced by simply removing the screws 72. This same removal feature can be used to remove rocks and other debris captured within the filter screen 32.

Figure 8:
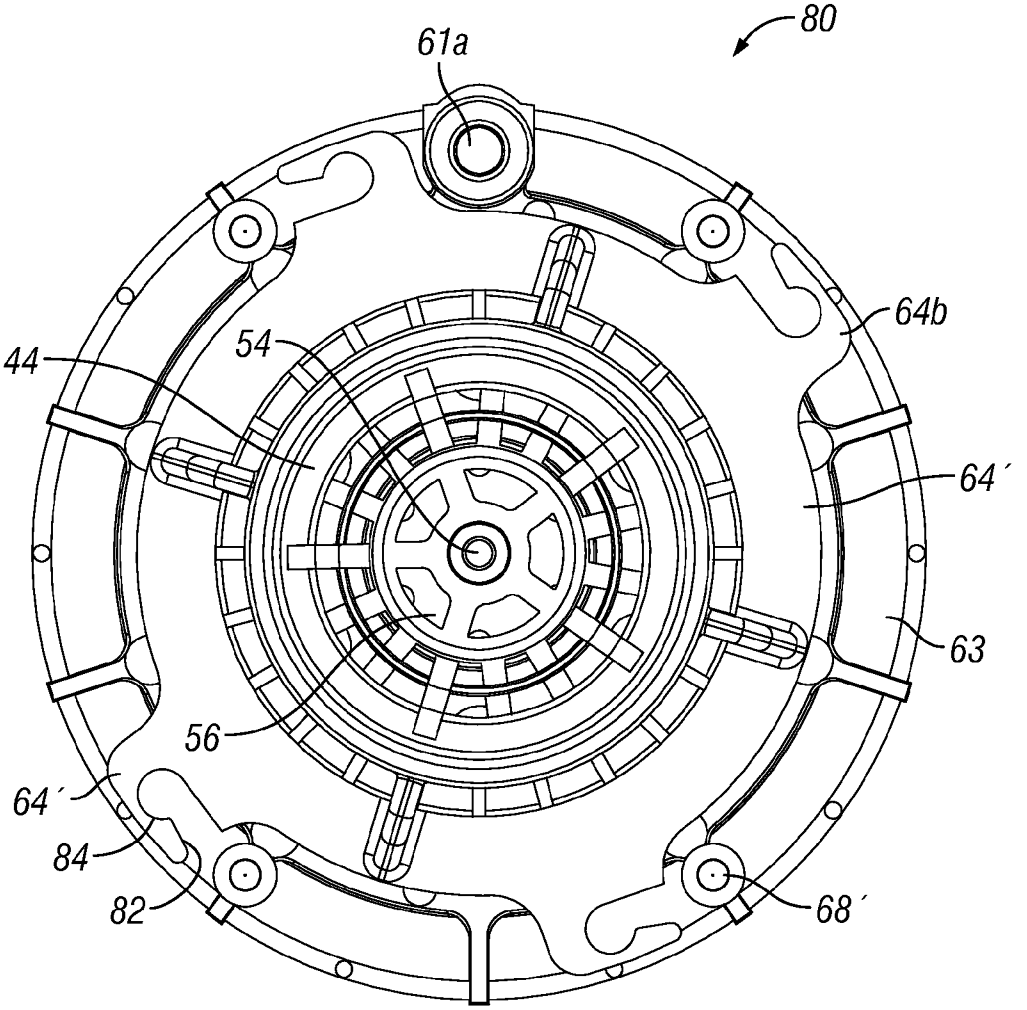
FIG. 8 is an enlarged bottom plan view of an alternate embodiment that allows the lower valve seat support basket to be unsnapped and separated from the upper valve support housing.

FIG. 8 illustrates an alternate embodiment 80 that allows the lower valve seat support basket 30 to be unsnapped and separated from the upper valve support housing 28. The four flanges 64*b* of the retaining ring 64' are formed with key-hole shaped slots 82 so that they can snap around corresponding flared posts 68'. When snapped into the assembled position, the hole portion 84 of each key-hole slot 82 is dimensioned to provide a loose fit to its corresponding flared retaining post 68', to allow the lower valve seat basket 30 to reciprocate relative to the upper valve support housing 28. If the valve seat 36 is damaged the lower valve seat support basket 30 and the integrally formed valve seat 36 can readily be removed and replaced by simply untwisting this structure clockwise and removing it from the upper valve support housing 28. This same removal feature can be used to remove rocks and other debris captured within the filter screen 32.

Figure 9:
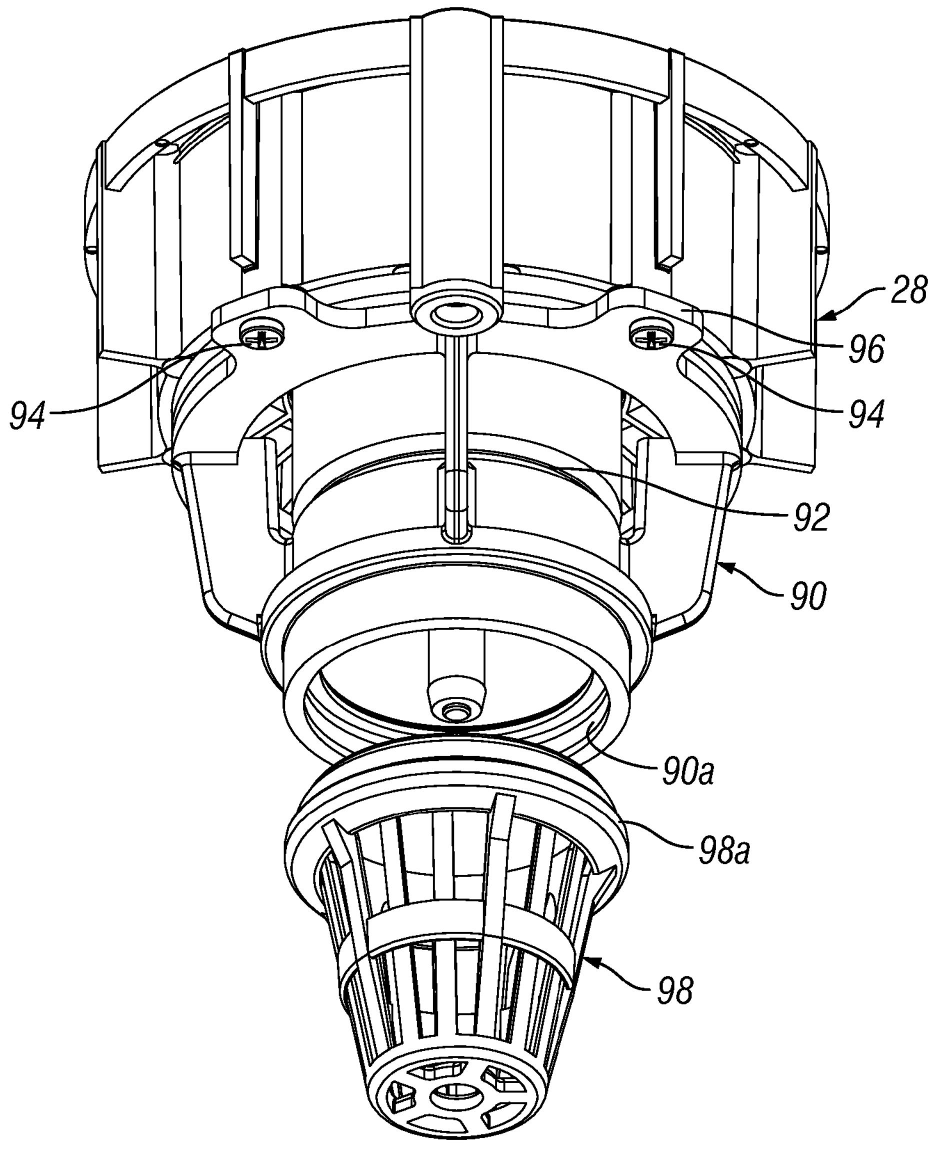
FIG. 9 is an exploded view of an alternate embodiment of the valve seat support basket that allows the basket and the valve seat to be disassembled and reassembled for maintenance.

FIG. 9 illustrates an alternate form of the valve seat support basket 90 having a valve seat 92. The valve seat support basket 90 is similar to the valve seat support basket 30 except that it can be readily disassembled from the upper valve support housing 28 for replacement if the valve seat 92 is damaged by removing screws 94. The screws 94 attach to retaining posts 66 to prevent flange 96, formed on support basket 90, from sliding off of the retaining posts 66 and allow the lower valve seat basket 30 to reciprocate relative to the upper valve support housing 28. A filter screen 98 has an upper end 98*a* with an annular lip that snap fits into an annular recess formed in the lower end 90*a* of the valve seat support basket 90. The filter screen 98 can be unsnapped to permit rocks and other debris to be removed from inside the filter screen. The filter screen 98 can then be snapped back together with the valve seat support basket 90.

While we have described an embodiment of the present invention, it should be understood that the sprinkler and diaphragm valve module can be modified in both arrangement and detail. For example, our invention can be implemented in a valve-in-head sprinkler that does not have a removable diaphragm valve module. The valve inside the valve module 14 need not include a diaphragm and could instead utilize only a piston. The filter screen 32 could be configured to be detachable from the lower end of valve seat support basket 30 via threads, snap fit projections or a bayonet attachment scheme, for example. The valve seat 36 could be a separate ring threaded into the upper portion of the valve seat support basket 30. Therefore, the protection afforded our invention should only be limited in accordance with the scope of the following claims.

We claim:

1. A valve module for removable installation inside an outer case of a sprinkler after removal of a riser with a nozzle normally mounted for reciprocation within the case, comprising:

an upper valve support housing;

a lower support basket removably connected to the valve support housing; and a valve member vertically reciprocable within the valve support housing to engage and disengage a valve seat in the support basket, the support basket being connected to the valve support housing with structure that slides generally parallel to an axis of reciprocation of the valve member so that the valve seat can reciprocate relative to the valve support housing whereby a closing force generated by the valve member does not apply a predetermined excessive loading on the structure that connects the upper valve support housing to the lower support basket under a predetermined high water pressure.

2. The valve module of claim 1 and further comprising a filter screen removably attached to the support basket.

3. The valve module of claim 1 wherein the support basket is connected to the valve support housing by a retaining ring that slides over a plurality of retaining posts that extend from the valve support housing.

4. The valve module of claim 3 wherein the retaining ring is connected to the valve seat by a plurality of ribs.

5. The valve module of claim 3 and further comprising a plurality of screws that prevent the retaining ring from sliding off of the plurality of retaining posts.

6. The valve module of claim 1 wherein the valve seat is integrally formed as a part of the support basket.

7. The valve module of claim 1 and further comprising a spring mounted for biasing the valve member toward a CLOSED position.

8. The valve module of claim 1 wherein the valve member is a piston valve member.

9. The valve module of claim 1 wherein the valve support housing further includes a cap portion, the valve member is a piston valve member, and a metering pin extends through the piston valve member and has an upper end seated in the cap portion.

10. The valve module of claim 1 and further comprising a plurality of first projections extending from the valve support housing and a plurality of second projections formed on the support basket that mate with the first projections to create a snap fit assembly to loosely attach the support basket to the valve support housing and allow the valve seat in the support basket to reciprocate up and down relative to the valve support housing.

11. A valve module for removable installation inside an outer case of a sprinkler after removal of a riser with a nozzle normally mounted for reciprocation within the case, comprising:

an upper valve support housing;

a lower support basket removably connected to the valve support housing; and a valve member vertically reciprocable to engage and disengage a valve seat in the support basket, the support basket being capable of vertical reciprocation relative to the valve support housing to reduce stresses on a structure that connects the support basket to the valve support housing when the valve support housing and the support basket are installed in the outer case, and wherein the support basket is connected to the valve support housing by a retaining ring that slides over a plurality of retaining posts that extend from the valve support housing.

12. The valve module of claim 11 and further comprising a filter screen removably attached to the support basket.

13. The valve module of claim 11 wherein the structure that connects the support basket to the valve support housing includes a plurality of ribs that connect the retaining ring to the support basket.

14. The valve module of claim 11 wherein the valve seat is integrally formed as part of the support basket.

15. The valve module of claim 11 and further comprising a spring mounted for biasing the valve member toward a CLOSED position.

16. The valve module of claim 11 wherein the valve support housing further includes cap portion, the valve member is a piston valve member, and a metering pin extends through the piston valve member and has an upper end seated in the cap portion.

17. The valve module of claim 11 and further comprising a plurality of screws that prevent the retaining ring from sliding off of the retaining posts.

18. A valve module for removable installation inside an outer case of a sprinkler after removal of a riser with a nozzle normally mounted for reciprocation within the case, comprising:

an upper generally cylindrical valve support housing;

a lower support basket having a valve seat, the support basket being removably connected to the valve support housing, and the support basket being capable of vertical reciprocation relative to the valve support housing;

a valve member vertically reciprocable to engage and disengage the valve seat in the support basket;

a filter screen removably attached to the support basket; and wherein the support basket is connected to the valve support housing by a retaining ring that slides over plurality of retaining posts that extend from the valve support housing.

19. A valve module for removable installation inside an outer case of a sprinkler after removal of a riser with a nozzle normally mounted for reciprocation within the case, comprising:

an upper valve support housing;

a lower support basket removably connected to the valve support housing;

a valve member vertically reciprocable to engage and disengage a valve seat in the support basket, the support basket being capable of vertical reciprocation relative to the valve support housing to reduce stresses on a structure that connects the support basket to the valve support housing when the valve support housing and the support basket are installed in the outer case; and a plurality of first projections extending from the valve support housing and a plurality of second projections formed on the support basket that mate with the first projections to create a snap fit assembly to loosely attach the support basket to the valve support housing and allow the valve seat in support basket to reciprocate up and down relative to the valve support housing.

20. The valve module of claim 19 wherein the valve seat is integrally formed as a part of the support basket.

* * * * *